United States Patent [19]

Takano

[11] Patent Number: 5,588,024
[45] Date of Patent: Dec. 24, 1996

[54] FREQUENCY SUBBAND ENCODING APPARATUS

[75] Inventor: Hideto Takano, Tokyo, Japan

[73] Assignee: NEC Corporation, Japan

[21] Appl. No.: 533,100

[22] Filed: Sep. 25, 1995

[30] Foreign Application Priority Data

Sep. 26, 1994 [JP] Japan ................................ 6-229889

[51] Int. Cl.$^6$ .................................................. H04B 14/04
[52] U.S. Cl. ........................ 375/242; 375/240; 395/2.38
[58] Field of Search ..................................... 375/240, 241, 375/242; 395/2.38, 2.39; 381/29, 37, 35; 348/398

[56] References Cited

U.S. PATENT DOCUMENTS

| 5,301,255 | 4/1994 | Nagai et al. | 395/2.39 |
| 5,365,553 | 11/1994 | Veldhuis et al. | 375/241 |
| 5,367,608 | 11/1994 | Veldhuis et al. | 395/2.38 |
| 5,440,596 | 8/1995 | Kneepkens et al. | 375/240 |
| 5,469,474 | 11/1995 | Kitabatake | 375/240 |

OTHER PUBLICATIONS

ISO/IEC 11172-3:1993 (E), pp. 70–71.

*Primary Examiner*—Stephen Chin
*Assistant Examiner*—T. Ghebretinsae
*Attorney, Agent, or Firm*—Ostrolenk, Faber, Gerb & Soffen, LLP

[57] ABSTRACT

The invention provides a frequency subband encoding apparatus wherein the amount of comparison operation processing of a bit allocator is minimized. A subband filter divides a PCM signal into and outputs a plurality of frequency subbands. A SMR calculator calculates, for each of the frequency subbands, an SMR which is a ratio between a signal level and a mask level. A bit allocator calculates a reference NMR which is a value obtained by subtracting, from an SMR of the entire frequency band, a S/N ratio calculated from a reference bit number to be allocated to one of the frequency subbands which exhibits a maximum SMR, and adjusts the reference NMR to perform bit allocation to the frequency subbands.

3 Claims, 11 Drawing Sheets

FIG. 4

| PROCESSING | COMPARISON OPERATION AMOUNT (TIMES) |
|---|---|
| S1 | 31 |
| S2 | 160 |
| S3 | 0 |
| S4 | 1 |
| S5 | 1 |
| S6 | 0 |
| S7 | 0 |
| S8 | 1 |
| S9 | 1 |
| S10 | 0 |
| S11 | 0 |
| S12 | 1 |
| S13 | 1 |
| S14 | 0 |
| S15 | 1 |
| S16 | 32 |
| S17 | 32 |
| S18 | 1 |
| S19 | 1 |
| S20 | 32 |
| S21 | 1 |
| S22 | 32 |
| S23 | 32 |
| S24 | 1 |

FIG. 6   PRIOR ART

| HEADER | CRC | BIT ALLOCATION | SCALE FACTOR | SAMPLE | ANCILLARY |

FIG. 7   PRIOR ART

| BIT NUMBER | S/N RATIO [dB] |
|---|---|
| 0 | 0.00 |
| 2 | 7.00 |
| 3 | 16.00 |
| 4 | 25.28 |
| 5 | 31.59 |
| 6 | 37.75 |
| 7 | 43.84 |
| 8 | 49.89 |
| 9 | 55.93 |
| 10 | 61.96 |
| 11 | 67.98 |
| 12 | 74.01 |
| 13 | 80.03 |
| 14 | 86.05 |
| 15 | 92.01 |

FIG. 9 PRIOR ART

| PROCESSING | COMPARISON OPERATION AMOUNT [TIMES] |
|---|---|
| P 1 | 3 3 |
| P 2 | 1 |
| P 3 | 1 |
| P 4 | 3 2 |
| P 5 | 3 3 |
| P 6 | 1 |

FIG. 10   PRIOR ART

| BAND NUMBER | SMR [dB] | BAND NUMBER | SMR [dB] |
|---|---|---|---|
| 0 | 88.0 | 16 | 0 |
| 1 | 88.0 | 17 | 0 |
| 2 | 88.0 | 18 | 0 |
| 3 | 88.0 | 19 | 0 |
| 4 | 88.0 | 20 | 0 |
| 5 | 88.0 | 21 | 0 |
| 6 | 81.0 | 22 | 0 |
| 7 | 81.0 | 23 | 0 |
| 8 | 0 | 24 | 0 |
| 9 | 0 | 25 | 0 |
| 10 | 0 | 26 | 0 |
| 11 | 0 | 27 | 0 |
| 12 | 0 | 28 | 0 |
| 13 | 0 | 29 | 0 |
| 14 | 0 | 30 | 0 |
| 15 | 0 | 31 | 0 |

FREQUENCY SUBBAND ENCODING APPARATUS

BACKGROUND OF THE INVENTION

1. Field of the Invention

This invention relates to a frequency subband encoding apparatus, and more particularly to a frequency subband encoding apparatus wherein mask levels for individual frequency subbands are calculated from a digital audio signal based on a psychoacoustic model and signal levels of the individual frequency subbands are detected from samples of the individual frequency subbands, and then signal to mask level ratios which are ratios of the signal levels and the mask levels are calculated for the individual frequency subbands and bit allocation amounts for the individual frequency subbands are determined from the signal to mask level ratios, whereafter samples of the individual frequency subbands are quantized with quantization step numbers determined from the bit allocation amounts.

2. Description of the Related Art

As an example of a conventional frequency subband encoding apparatus, a frequency subband encoding apparatus is described in the ISO/IEC 11172-3 standards (hereinafter referred to as "MPEG/Audio system"), Layer 1.

FIG. 5 shows in block diagram the conventional frequency subband encoding apparatus. Referring to FIG. 5, the frequency subband encoding apparatus includes a subband filter 1, a scale factor determinator 2, a quantizer 3, an SMR calculator 4 for outputting, for each of frequency subbands, a signal to mask level ratio (hereinafter referred to as SMR) which is a ratio between a signal level of the frequency subband and a mask level for the frequency subband based a psychoacoustic model, a bit allocator 15 for determining a bit allocation amount, and a multiplexer 6.

The subband filter 1 outputs values of a PCM (Pulse Code Modulation) signal 7 divided into 32 frequency subbands. The sampling frequency of the output signal of the PCM signal 7 is equal to 1/32 the sampling frequency of the PCM signal 7. The scale factor determinator 2 determines, from an output value of each of the frequency subbands of the subband filter 1, and outputs a scale factor for use to perform normalization for each 12 samples of the frequency subband. The SMR calculator 4 calculates a mask level for each of the individual frequency subbands from the PCM signal 7 based on a psychoacoustic model, calculates a signal level from samples of each of the frequency subbands and the corresponding scale factor, and calculates and outputs, for each frequency subband, a ratio (SMR) between the signal level and the mask level, which is a ratio between the two levels. The bit allocator 15 determines a bit allocation amount for each of the frequency subband from the SMR of the frequency subband. The quantizer 3 quantizes, with the bit allocation amount and the scale factor for each of the frequency subbands, samples of the frequency subband and outputs the thus quantized samples. The multiplexer 6 multiplexes the bit allocation information from the bit allocator 15, the scale factors from the scale factor determinator 2 and the quantized values from the quantizer 3 and outputs a bit stream 8.

The number of bits included in one frame of the "MPEG/Audio Layer 1" system depends upon the values of the bit rate and the sampling frequency. As an example, when the bit rate is 192 kbps and the sampling frequency is 48 kHz, the number of bits of one frame is 1,536 bits in accordance with the standards mentioned above.

The structure of one frame of the "MPEG/Audio Layer 1" system includes, for example, as shown in FIG. 6, factors of a header, a CRC (Cyclic Redundancy Code), a bit allocation, a scale factor, a sample and an ancillary bit.

The header normally includes 32 bits, and the bit allocation requires 4 bits for each frequency subband and totally requires 128 (4×32) bits/ch. The other factors vary depending upon conditions. The header includes a bit representing whether or not a CRC is present. When a CRC is present, 16 bits are required for the CRC. The scale factor requires, when the bit allocation to each frequency subband is not equal to 0, 6 bits for each frequency subband. The sample requires, when the bit allocation to each frequency subband is not equal to 0, 12 bits for each one bit of the bit allocation. The ancillary bit includes bits provided by a number equal to the remaining number when a total number of bits mentioned above is subtracted from a total bit number of one frame.

A maximum bit number allocated by bit allocation processing exhibits a maximum value when the ancillary bit is not allocated intentionally without a CRC. The total bit number of the scale factor and the sample which is an allocatable bit number of one frame in the aforementioned case wherein the bit rate is 192 kbps and the sampling frequency is 48 kHz is 1,376 (1,536–(32+128)) bits.

The relationship between the allocated bit number for each of the frequency subbands and the signal to noise ratio (S/N ratio) which depends upon the allocated bit number is illustrated in FIG. 7. The bit numbers allocated to the frequency subband range from 0 to 15 bits except one bit (not shown in FIG. 7).

FIG. 8 is a flow chart illustrating bit allocation processing of the conventional frequency subband encoding apparatus shown in FIG. 5. While the MPEG/Audio system allows encoding of up to 2 channels, description is given here of bit allocation processing for one channel. At step P1, a frequency subband which exhibits a maximum SMR among SMR values of the 32 frequency subbands is detected, and the allocated bit number of the frequency subband is increased by one step (FIG. 7) and a new SMR is detected in accordance with the thus increased bit number. When bits are allocated to the frequency subband at first (when 2 bits are allocated to the frequency subband to which 0 bit has been allocated in FIG. 5), totaling 30 bits are allocated including 6 bits allocated to the scale factor and 24 bits allocated to the sample (2×12=24 since the audio signal is sectioned into 12 samples with respect to the time base in one frame). As a result, if the thus allocated bit number becomes equal to 15 bits (maximum bits in FIG. 7) which are a limit value, then the frequency subband is removed from the object of comparison processing of the SMR so that no allocation processing may occur later with the frequency subband. When bits are to be allocated to any frequency subband to which bits (two or more bits) have been allocated already, only 12 bits (1×12) are allocated to the sample. The thus allocated bit number is subtracted from the allocatable bit number.

At step P2, it is discriminated whether or not the allocatable bit number is equal to or greater than 30, and if the allocatable bit number is equal to or greater than 30, then the control sequence returns to step P1. On the contrary if the allocatable bit number is smaller than 30, the control sequence advances to step P3. At step P3, it is discriminated whether or not the allocatable bit number is smaller than 12. If the allocatable bit number is smaller than 12, then the processing is ended. However, if the allocatable bit number is equal to or greater than 12, then the control sequence advances to step P4. At step P4, frequency subbands to which bits have not been allocated are removed from the object of comparison processing of the SMR so that allocation processing may not occur later with the frequency subbands.

Then at step P5, a frequency subband which exhibits a maximum SMR among the SMR values of the 32 frequency subbands is detected, and the allocated bit number of the frequency subband is increased by one step. As a result, if the allocated bit number becomes equal to 15 which is the limit value, then the frequency subband is removed from the object of comparison processing of the SMR so that allocation processing may not thereafter occur with the frequency subband. Further, the allocated bit number is subtracted from the allocatable bit number. Then at step P6, it is discriminated whether or not the allocatable bit number is equal to or greater than 12. If the allocatable bit number is equal to or greater than 12, then the control sequence returns to step P5. However, if the allocatable bit number is smaller than 12, then the processing is ended.

Comparison processing for repeating a fixed number of processing operations is included in each of the processing operations at steps P1, P4 and P5. Such processing can be reduced by describing a same process in series by a necessary number of times. Therefore, the numbers of times of comparison processing operations at the individual processing operations except repetitive processing operations of the fixed numbers are such as illustrated in FIG. 9.

The condition wherein the bit allocation processing amount described above exhibits a maximum value is the case wherein the number of repetitions from step P1 to step P2 exhibits a maximum value. This because, since the bit allocation is one-sided to a certain frequency subbands, the bit number of the scale factor is reduced while the bit number of the sample is increased and consequently the processing number of times from step P1 to step P2 exhibits a maximum value. In the case described above wherein the bit rate is 192 kbps and the sampling frequency is 48 kHz, the repetition number exhibits a maximum value when 14 bits are allocated to the frequency subbands 0 to 5, 13 bits are allocated to the frequency subbands 6 to 7 and 0 bits are allocated to the other frequency subbands.

As an example which includes such bit allocation as described above, in such SMR values as illustrated in FIG. 10, the processing operations from step P1 to step P2 are repetitively executed by 101 times, and the processing operations from step P5 to step P6 are executed once. As a result, comparison processing occurs by a total number of 3,501 times. The bit allocator 15 which performs such bit allocation processing as described above in the conventional frequency subband encoding apparatus of FIG. 5 is realized, for example, using a microprocessor.

In the conventional frequency subband encoding apparatus described above, the processing of the bit allocator includes a large number of comparison processing operations. Therefore, the conventional frequency subband encoding apparatus is disadvantageous in that, in order to encode an audio signal on the predetermined real time basis, a microprocessor and other hardware elements having a high processing capacity are required and a very high cost is required for the apparatus.

SUMMARY OF THE INVENTION

It is an object of the present invention to provide a a frequency subband encoding apparatus wherein the amount of comparison operation processing of a bit allocator is minimized.

In order to attain the object described above, according to the present invention, there is provided a frequency subband encoding apparatus, comprising a subband filter for dividing a digital audio signal into a plurality of frequency subbands, a signal to mask level ratio calculator for calculating mask levels for the individual frequency subbands from the digital audio signal based on a psychoacoustic model, detecting signal levels of the individual frequency subbands from samples of the frequency subbands and outputting signal to mask level ratios which are ratios between the signal levels and the mask levels for the individual frequency subbands, a bit allocator for determining a reference noise to mask level ratio (NMR) which is a value obtained by subtracting, from a signal to mask level ratio of the entire frequency band, a signal to noise ratio calculated from a reference bit number to be allocated to one of the frequency subbands which exhibits a maximum signal to mask level ratio and adjusting the reference NMR to perform bit allocation, and a quantizer for quantizing samples of the individual frequency subbands with quantization step numbers calculated from bit allocation amounts to the individual frequency subbands. The bit allocator temporarily allocates, to those of the frequency subbands which have higher signal to mask level ratios than the reference NMR, bit numbers corresponding to differences between the signal to mask level ratios and the reference NMR and then adjusts the reference NMR to perform bit allocation repetitively until a remaining bit number after the temporary bit allocation exhibits a minimum value.

In the frequency subband encoding apparatus, a reference NMR is calculated from a maximum SMR and a reference bit number, and temporary bit allocation is performed based on the reference NMR. Then, by adjusting the reference NMR, temporary bit allocation is performed until an allowable bit number is reduced to a minimum value. Thereafter, allocation processing of a remaining bit number or releasing processing of an insufficient bit number is performed. By this process, the number of comparison processing operations in bit allocation processing can be reduced comparing with that required with the conventional frequency subband encoding apparatus. According to a preferred form, the number of comparison processing operations can be reduced from 3,501 with the conventional frequency subband encoding apparatus to 272 with the frequency subband encoding apparatus of the present invention.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 4 is a view illustrating comparison operation amounts at individual steps of operations in the bit allocation processing of the frequency subband encoding apparatus of FIG. 1;

FIG. 6 is a diagrammatic view showing a structure of a frame of the MPEG/Audio Layer 1 system;

FIG. 7 is a diagrammatic view illustrating the relationship between the allocated bit number and the S/N ratio;

FIG. 9 is a diagrammatic view illustrating comparison operation amounts at individual steps of operations in the conventional bit allocation processing illustrated in FIG. 8; and FIG. 10 is a diagrammatic view illustrating an example of SMR values for individual frequency subbands when the comparison operation processing amount exhibits a maximum value in the conventional bit allocation processing illustrated in FIG. 8.

DESCRIPTION OF THE PREFERRED EMBODIMENT

Figure 1:
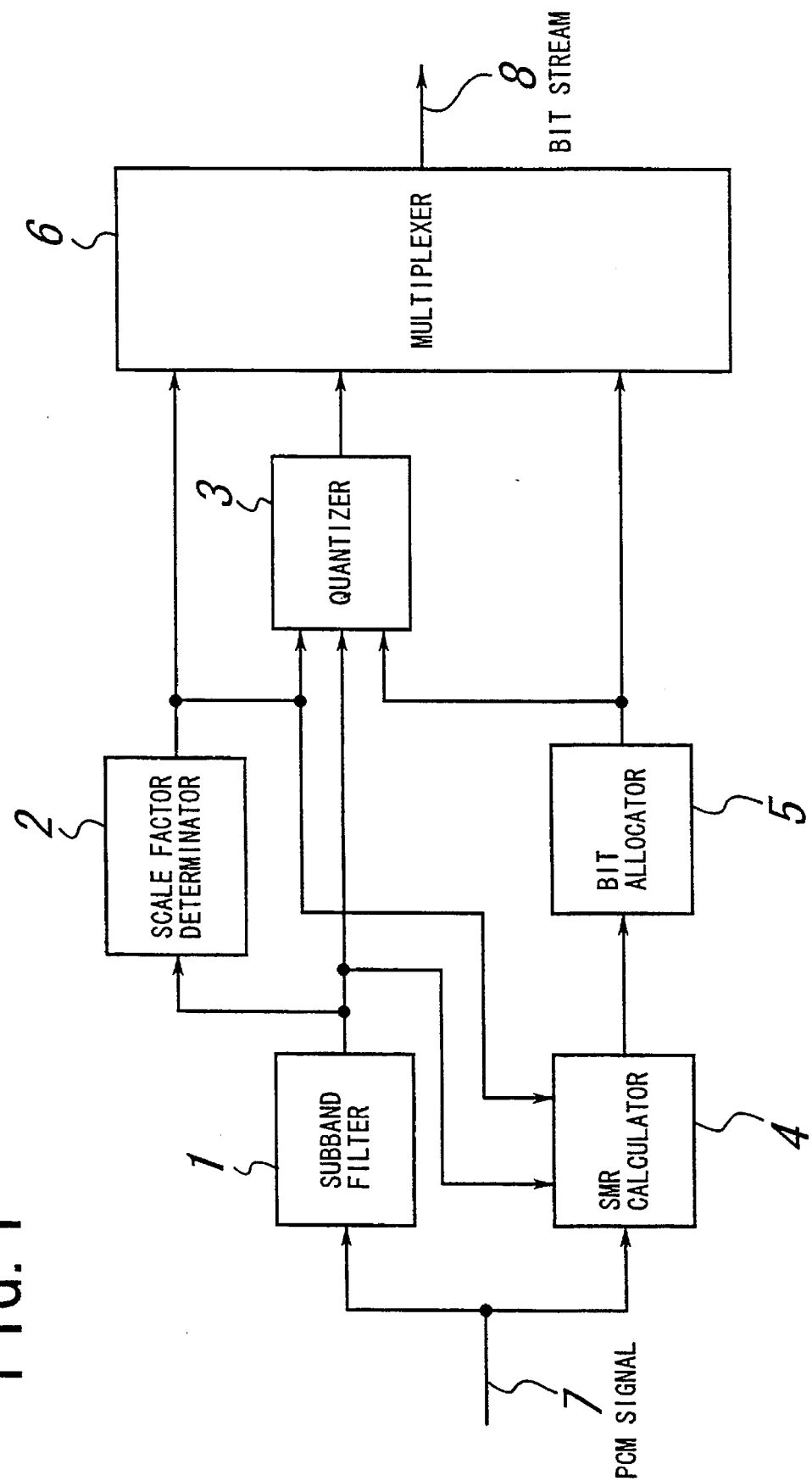
FIG. 1 is a block diagram of a frequency subband encoding apparatus showing a preferred embodiment of the present invention.
Figure 5:
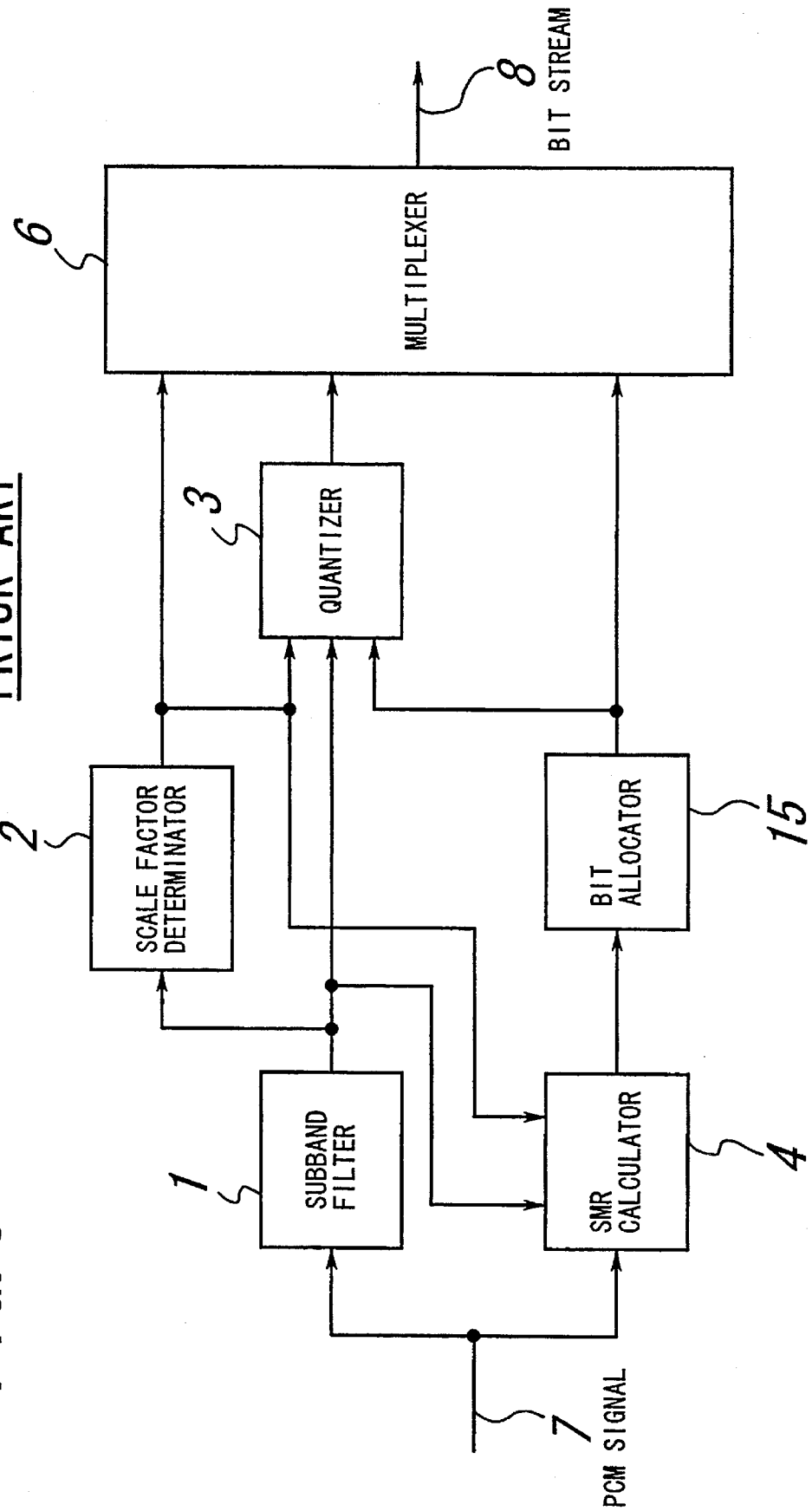
FIG. 5 is a block diagram showing a conventional frequency subband encoding apparatus.
Figure 8:
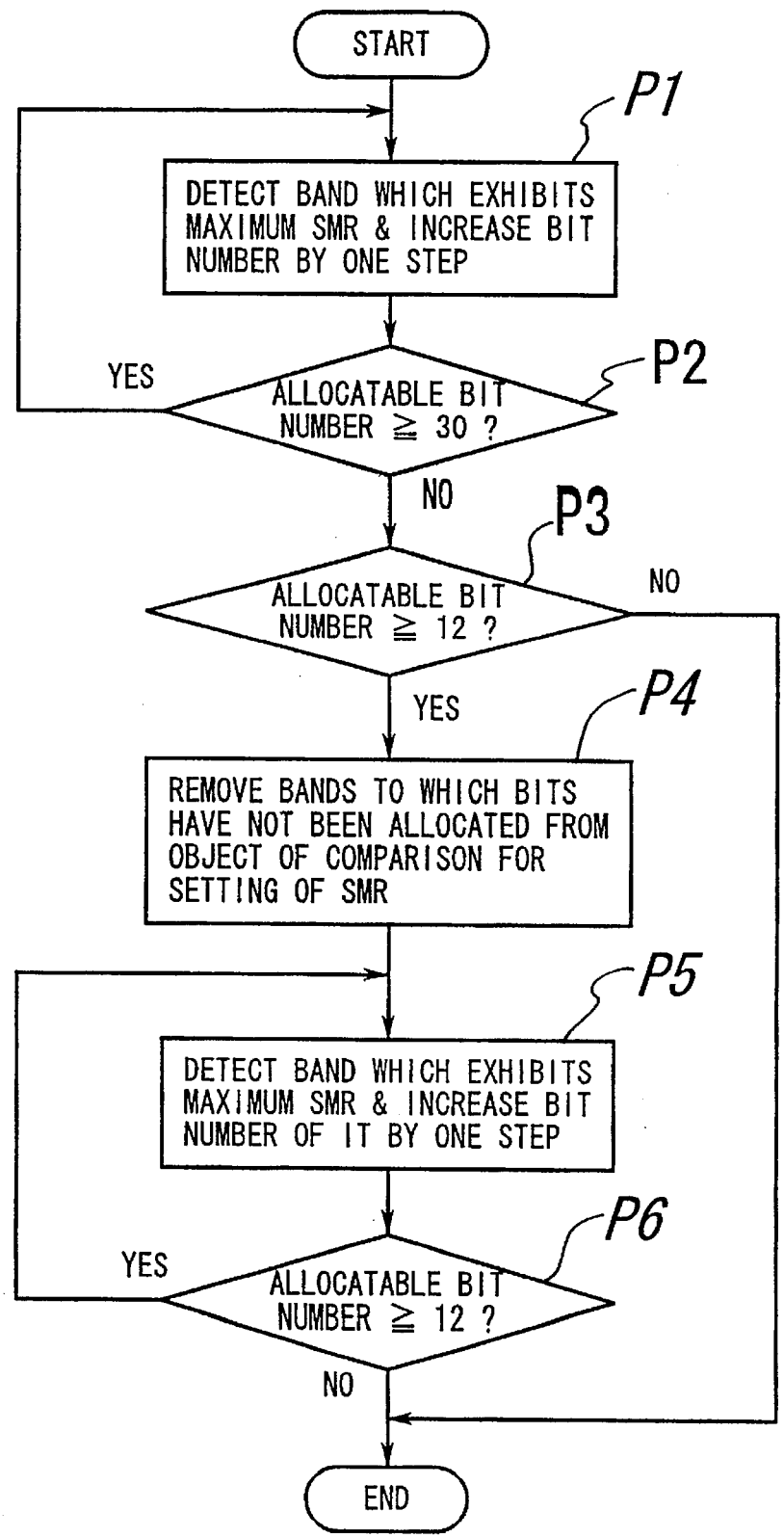
FIG. 8 is a flow chart illustrating conventional bit allocation processing.

Referring first to FIG. 1, there is shown a frequency subband encoding apparatus to which the present invention is applied. The frequency subband encoding apparatus includes, similarly to the conventional frequency subband encoding apparatus described hereinabove with reference to FIG. 5, a subband filter 1, a scale factor determinator 2, a quantizer 3, an SMR calculator 4 for outputting, for each of frequency subbands, a signal to mask level ratio (SMR) which is a ratio between a signal level of the frequency subband and a mask level for the frequency subband based a psychoacoustic model, a bit allocator 5 for determining a bit allocation amount, and a multiplexer 6. The present frequency subband encoding apparatus is different from the conventional frequency subband encoding apparatus of FIG. 5 only in that the bit allocator 5 operates in a manner different from that of the bit allocator 15. Therefore, only operation of the bit allocator 5 will be described in detail below.

Figure 2A:
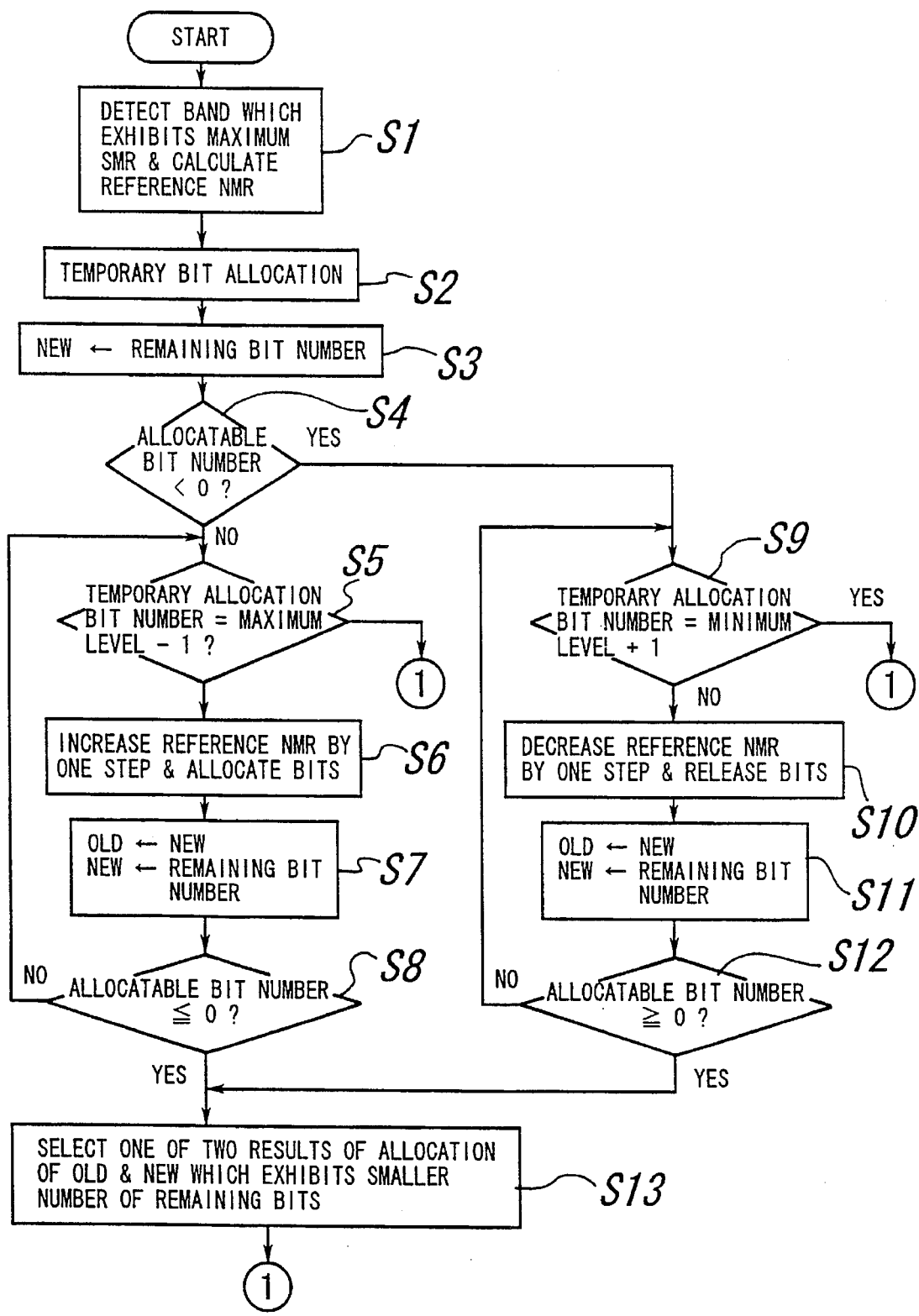
FIGS. 2(a) and 2(b) are flow charts illustrating bit allocation processing of the frequency subband encoding apparatus of FIG. 1.
Figure 2B:
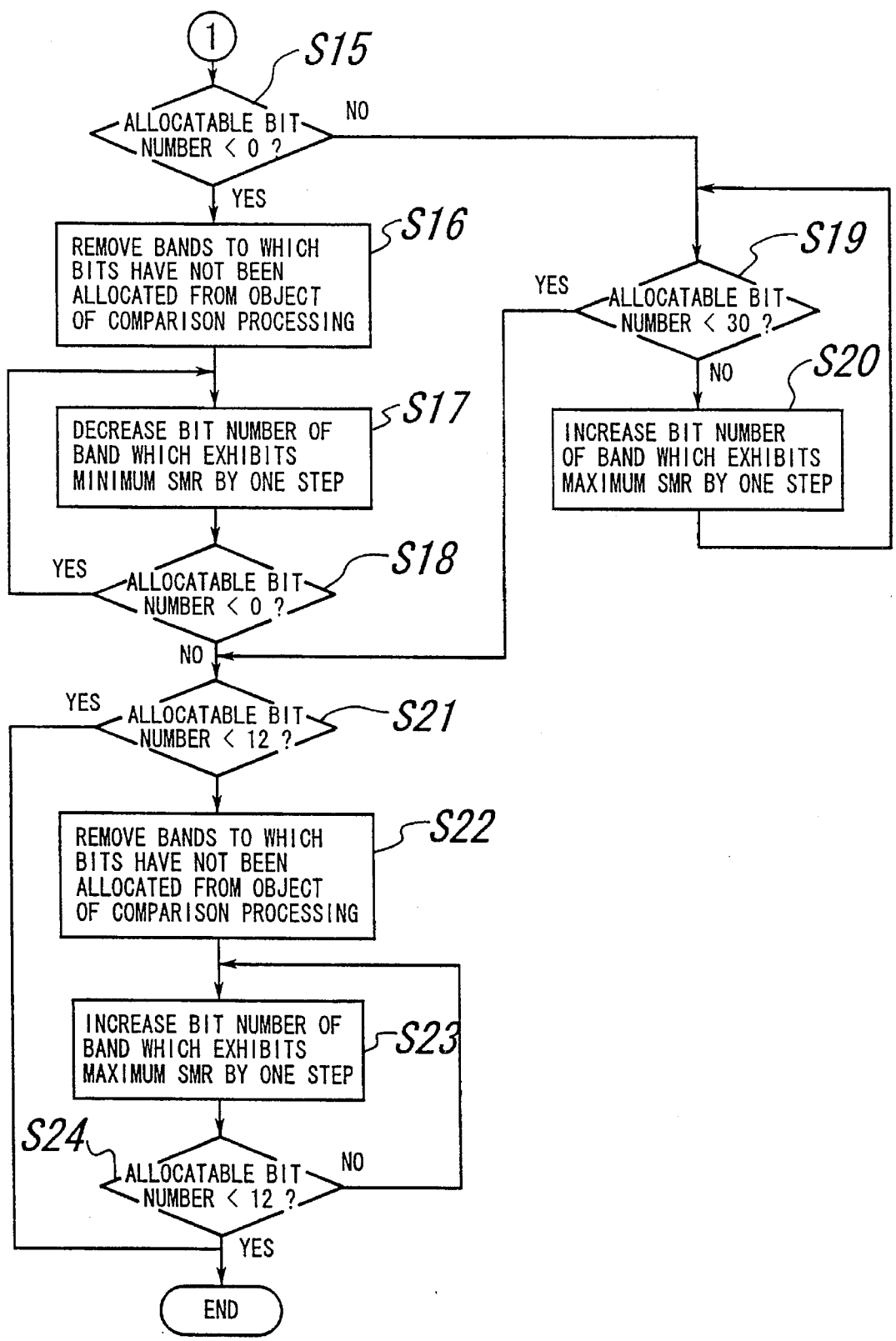
Figure 3:
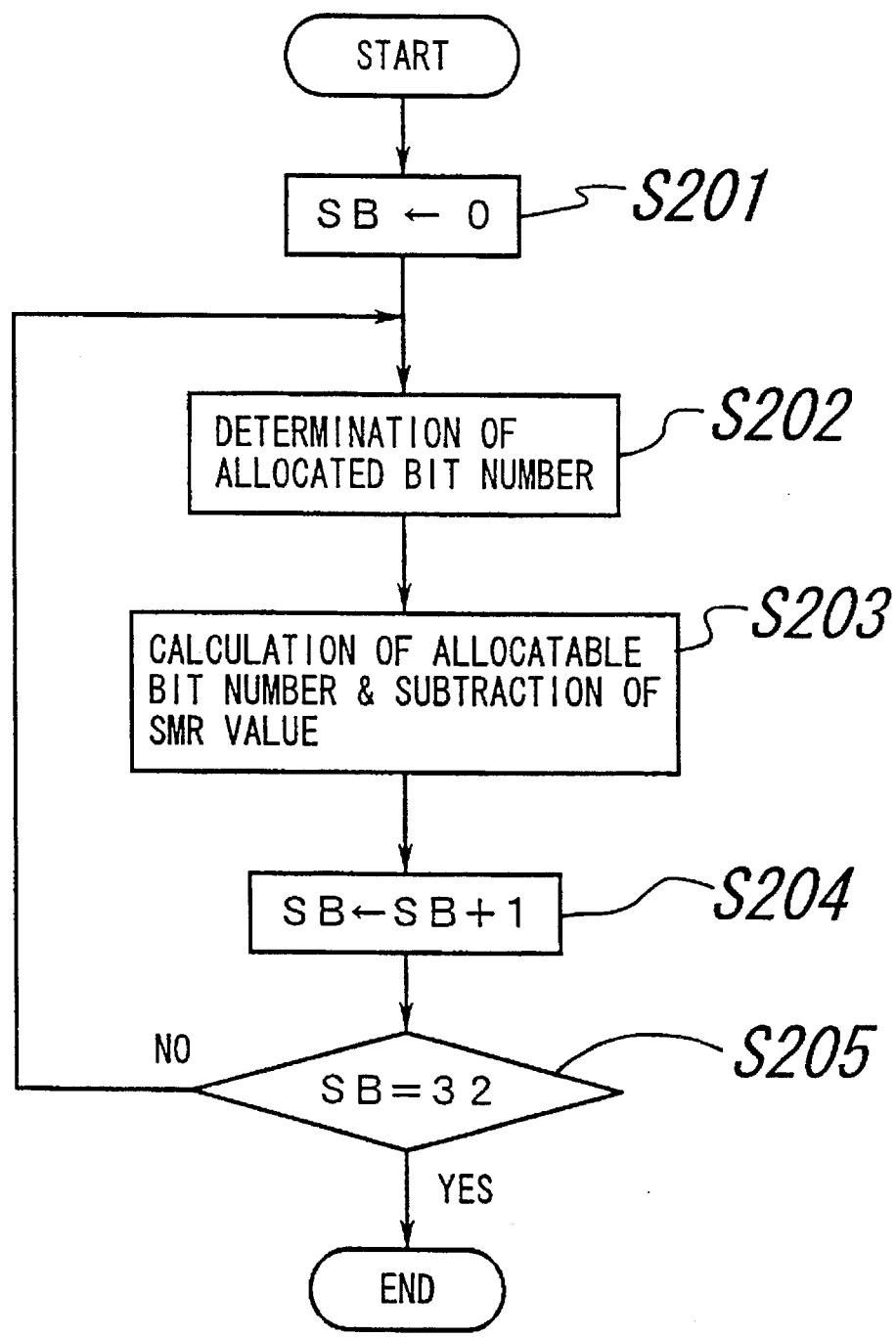
FIG. 3 is a flow chart illustrating temporary bit allocation processing of the frequency subband encoding apparatus of FIG. 1.

A procedure of bit allocation processing of the bit allocator 5 is illustrated in FIGS. 2(a), 2(b) and 3. Referring first to FIG. 2(a), first at step S1, a frequency subband which exhibits a maximum signal to mask level ratio (SMR) among 32 frequency subbands is detected. A value obtained by subtracting, from the maximum SMR, an S/N ratio which corresponds to a number of bits (reference bit number) to be allocated to the frequency subband which has the maximum SMR is determined as reference NMR. At step S2, to those frequency subbands whose SMR is higher than the reference NMR, bit numbers corresponding to the differences of the SMR values from the reference NMR are temporarily allocated.

Details of the temporary allocation processing are illustrated in FIG. 3. Referring to FIG. 3, first at step S201, "0" is substituted into a variable SB, and then at step S202, a temporary allocation bit number is determined from the difference of an SMR corresponding to the variable SB from the reference NMR. Upon such determination of the allocation bit number, one of 16 different bit allocation levels is selected based on the relationship between the S/N ratio and the bit number illustrated in FIG. 7. Consequently, by employing the present searching technique, an allocated bit number can be determined by five comparison processing operations. At step S203, a used bit number determined from the thus determined bit number is subtracted from an allocatable bit number, and an SMR determined from the allocated bit number is subtracted from the SMR of the frequency subband. Then at step S204, the variable SB is incremented by one, and then at step S205, it is discriminated whether or not the variable SB is equal to 32. If the variable SB is not equal to 32, then the control sequence returns to step S202, but if the variable SB is equal to 32, then the temporary allocation processing of FIG. 3 is ended and the control sequence returns to the original routine.

Referring back to FIG. 2(a), a remaining bit number is substituted into a variable NEW at step S3. Then at step S4, it is discriminated whether or not the allocatable bit number after such bit allocation as described above is smaller than 0. When the allocatable bit number is equal to or greater than 0, the control sequence advances to step S5, but when the allocatable bit number is smaller than 0, the control sequence advances to step S9. At step S5, it is discriminated whether or not the reference bit number is equal to 14 which is smaller by one than a maximum allocatable bit number. When the reference bit number is 14, the temporary allocation processing is ended and the control sequence advances to step S15 illustrated in FIG. 2(b). On the contrary when the reference bit number is not equal to 14 at step S5, the control sequence advances to step S6, at which the reference bit number is increased by one step and the reference NMR is calculated again, and then temporary bit allocation is performed. Then at step S7, the variable NEW is substituted into another variable OLD and the allocatable bit number is substituted into the variable NEW. At step S8, it is discriminated whether or not the allocatable bit number is greater than 0. If the allocatable bit number is greater than 0, the control sequence returns to step S5, but otherwise, the control sequence advances to step S13.

On the other hand, at step S9, it is discriminated whether or not the reference bit number is equal to 2 prior by one step to the non-allocated condition. If the reference bit number is equal to 2, then the temporary allocation processing is ended and the control sequence advances to step S15 of FIG. 2(b). If the reference bit number is not equal to 2 at step S9, then the control sequence advances to step S10, at which the reference bit number is decreased by one step and the reference NMR is calculated again, and then bit releasing is performed. Then at step S11, the released bit number is added to the allocatable bit number, and at step S12, it is discriminated whether or not the allocatable bit number is equal to or greater than 0. If the allocatable bit number is smaller than 0, the control sequence returns to step S9, but on the contrary if the allocatable bit number is equal to or greater than 0, the control sequence advances to step S13. At step S13, the variable OLD and an absolute value of the variable NEW are compared with each other, and if the absolute value of the variable NEW is greater, then the variable OLD is substituted into the remaining bit number and also the bit allocation information is returned to the value of the variable OLD. Thereafter, the control sequence advances to step S15 of FIG. 2(b).

Referring now to FIG. 2(b), at step S15, the remaining bit number is checked. If the remaining bit number is smaller than 0, then the control sequence advances to step S16, but if the remaining bit number is equal to or greater than 0, the control sequence advances to step S19. At step S16, those frequency subbands to which bits have not been allocated yet are removed from the object of comparison processing of the SMR. Then at step S17, a frequency subband which exhibits a minimum SMR is detected, and the allocated bit number of the frequency subband is decreased by one step. Subsequently at step S18, it is discriminated whether or not the allocable bit number is smaller than 0. If the allocable bit number is smaller than 0, then the control sequence returns to step S17, but if the allocable bit number is equal to or greater than 0, then the control sequence advances to step S21.

On the other hand, at step 19, it is discriminated whether or not the allocable bit number is smaller than 30. When the allocable bit number is smaller than 30, the control sequence advances to step S21, but when the allocable bit number is equal to or greater than 30, the control sequence advances to step S20. At step S20, a frequency subband which exhibits a maximum SMR is detected, and the allocated bit number of the frequency subband is increased by one step, whereafter the control sequence returns to step S19.

At step S21, it is discriminated whether or not the allocable bit number is smaller than 12. If the allocable bit number is smaller than 12, then the processing is ended. On the contrary if the allocable bit number is equal to or greater than 12, then the control sequence advances to step S22, at which those frequency subbands to which bits have not been allocated yet are removed from the object of the comparison processing of the SMR. Then at step S23, a frequency subband which exhibits a maximum SMR is detected, and the allocated bit number of the frequency subband is increased by one step. Subsequently at step S24, it is discriminated whether or not the remaining bit number is smaller than 12. If the remaining bit number is smaller than 12, then the processing is ended, but on the contrary if the remaining bit number is equal to or greater than 12, then the control sequence returns to step S23.

FIG. 4 illustrates comparison operation numbers which are comparison processing amounts of the various processing operations in the present embodiment. The comparison operation numbers in the present embodiment are calculated in the condition in which the comparison calculation amount by the conventional frequency subband encoding apparatus exhibits a maximum value. Here, the reference bit number is selected to be 9 bits. From step S4, the control sequence advances to step S5, and the processing operations at steps S5 to S8 are repeated by five times. From step S15, the control sequence advances to step S19, and from step S19, the control sequence advances to step S20. Then, when the control sequence advances to step S19 for the third time, the control sequence advances from step S19 to step S21, from which the control sequence comes to an end. Consequently, the total number of comparison operations is 272. Meanwhile, the result of the bit allocation processing is the same as that obtained by the conventional frequency subband encoding apparatus.

Having now fully described the invention, it will be apparent to one of ordinary skill in the art that many changes and modifications can be made thereto without departing from the spirit and scope of the invention as set forth herein.

What is claimed is:

1. A frequency subband encoding apparatus comprising:
   a subband filter for dividing a digital audio signal into a plurality of frequency subbands;
   a signal to mask level ratio calculator for calculating mask levels for the individual frequency subbands from the digital audio signal based on a psychoacoustic model, detecting signal levels of the individual frequency subbands from samples of the frequency subbands and outputting signal to mask level ratios which are ratios between the signal levels and the mask levels for the individual frequency subbands;
   a bit allocator for determining a reference NMR which is a value obtained by subtracting, from a signal to mask level ratio of the entire frequency band, a signal to noise ratio calculated from a reference bit number to be allocated to one of the frequency subbands which exhibits a maximum signal to mask level ratio and adjusting the reference NMR to perform bit allocation, wherein said bit allocator temporarily allocates, to those of the frequency subbands which have higher signal to mask level ratios than the reference NMR, bit numbers corresponding to differences between the signal to mask level ratios and the reference NMR and then adjusts the reference NMR to perform bit allocation repetitively until a remaining bit number after the temporary bit allocation exhibits a minimum value; and
   a quantizer for quantizing samples of the individual frequency subbands with quantization step numbers calculated from bit allocation amounts to the individual frequency subbands.

2. A frequency subband encoding apparatus as claimed in claim 1, wherein a limit to a number of bits which can be allocated to one frame of the digital audio signal and a limit to maximum numbers of bits allocatable to the individual frequency subbands are determined in advance.

3. A frequency subband encoding apparatus as claimed in claim 2, wherein the digital audio signal has a bit rate of 192 kbps and a sampling frequency for the digital audio signal is 48 kHz, and the limit to the number of bits allocatable to one frame is 1,536 bits and the limit to the maximum numbers of bits allocatable to the individual frequency subbands is 15 bits.

* * * * *